March 11, 1958     D. E. CHILD     2,826,074
GOLF PRACTISE DEVICE
Filed June 19, 1956
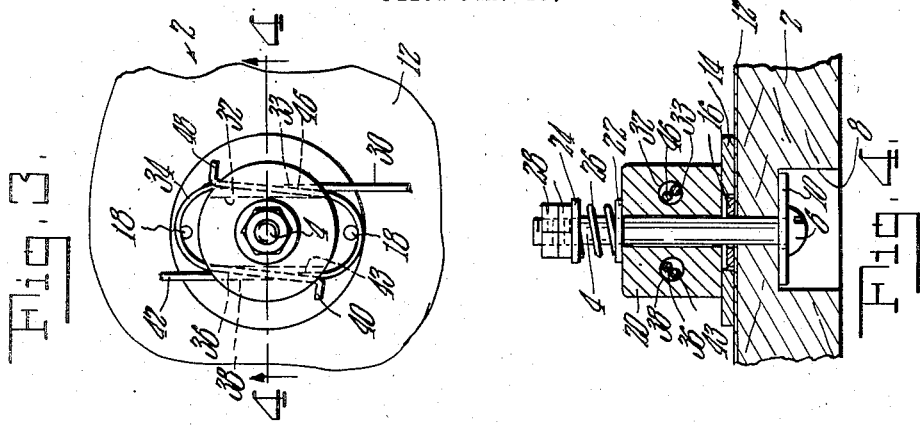
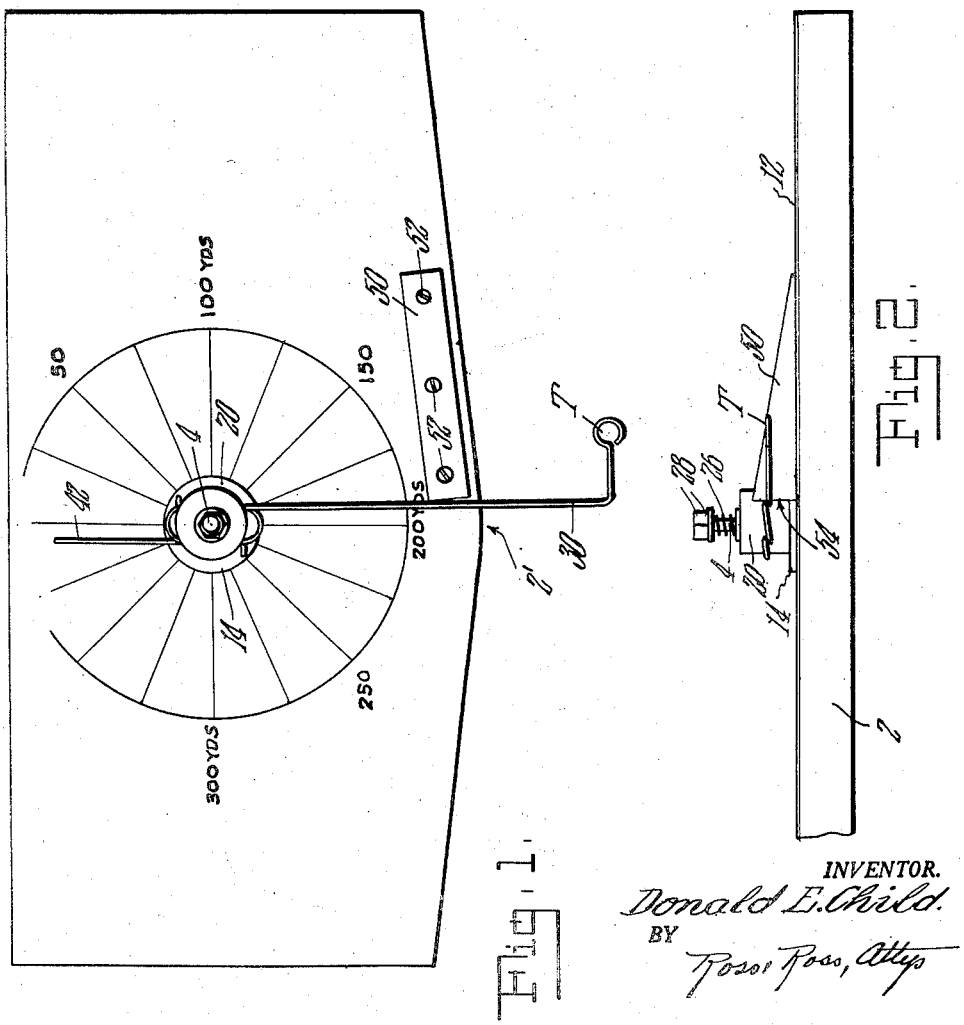
INVENTOR.
Donald E. Child.
BY
Rosoe Ross, Attys

United States Patent Office 2,826,074
Patented Mar. 11, 1958

2,826,074

GOLF PRACTISE DEVICE

Donald E. Child, Putnam, Conn.

Application June 19, 1956, Serial No. 592,431

4 Claims. (Cl. 73—379)

This invention relates to game practise apparatus and is directed more particularly to apparatus for the practise of the golf game.

The principal object of the invention is directed to the provision of apparatus for the practise of the golf club stroke to aid one in improving his driving ability.

In a general way, the apparatus of the invention is adapted to visually indicate the length of drive of a ball as a golf club is swung into contact with a component of the apparatus.

The apparatus is readily portable and may be used within or out of doors wherefor it is possible for one interested in golf to practise at all convenient times.

According to novel features of the invention, the apparatus in a general way includes a light weight, resilient and strong arm having an outer tee end and an inner end associated with a hub which is frictionally held against rotation. The arm or an indicator is registrable with the graduations of a scale on rotation of said hub and said scale may be calibrated to indicate a length of drive according to the angle of rotation of the hub on impact of the head of a golf club with the outer tee end of the arm. The apparatus could be arranged to indicate the speed or force of the impact in pounds or some other factor.

The arm of the apparatus being flexible and springlike, a club head may strike the tee end of the arm with great force and without injury to the apparatus. A wide angle of movement of the arm when struck by a club results in a relatively less angle of rotation of the hub, and is accounted for by the frictional connection of the hub and associated parts. The degree of friction may be varied within wide limits if desired.

In practise with the apparatus, the golf club head may strike the tee end of the arm directly as the club is swung for a drive. If desired, a practise ball may be placed on the tee for practise purposes.

The apparatus is adapted for use by both right and left hand golfers and, if desired, various instructions may accompany the apparatus all to the end that by use of the apparatus the golf game is greatly improved in a short time.

The apparatus is relatively simple in form not only to provide economy in manufacture but also to obviate expensive maintenance.

The apparatus is arranged for ready and easy adjustment thereby to insure the desired accuracy in calibration for the faithful indications of the user's skill or lack of it.

In a general way and in practise with the apparatus the tee of the arm, which may or may not carry a practise ball, is struck by the head of the golf club in the stroke thereof. The speed of the head or the force thereof at the time of impact with the tee end of the arm flexes the arm so that it swings in the direction of movement of the club head. Swinging of the arm brings about rotation of the hub which is resisted by means of friction. Assume that with a certain speed or force of impact a golf ball would be driven a certain number of yards. The friction means may be adjusted so that the hub is rotated through a certain angle to bring an indicator or the arm, when at rest, in register with a certain indicia indicative of said certain yards. Thus in the practise the golfer may visualize relative to his stroke, what the drive would be on the golf course.

The apparatus will be described in connection with the form at present preferred and for the use referred to but it will be understood that various changes and modifications may be made and that the apparatus may be adapted for other uses within the range and scope of the invention as set forth in the appended claims.

In the drawings:

Fig. 1 is a plan view of golf practise apparatus embodying the novel features of the invention;

Fig. 2 is a front elevational view of the apparatus shown in Fig. 1;

Fig. 3 is an enlarged plan view of the central hub of the apparatus shown in Figs. 1 and 2; and Fig. 4 is a sectional elevational view on the line 4—4 of Fig. 3.

Referring now to the drawings more in detail, the invention will be fully explained.

A base or plate is represented by 2 which may be formed from wood or other suitable material.

A central staff or pivot is in the form of a screw 4, the head 6 of which is disposed in a recess 8 in the lower side of the base. Said screw extends upwardly through a washer 10 and the base and is preferably rather tight in said base.

An upper facing 12 is secured to the upper face of the base 2 and may include paper sheeting or any other desired material.

A friction member in the form of a washer 14, preferably of metal, is disposed on the facing around the staff 4 and a smaller washer 16 is disposed within the central opening of said washer 14, as shown.

The friction washer 14 is held against turning by pins 18 of the base which are receivable in suitable openings of said washer, as shown in Fig. 3.

A hub 20 is rotatable on the staff 4 and will be formed from wood or other suitable material adapted for frictional engagement with the friction member 14.

It is desirable that the frictional contact between the hub and friction member 14 be disposed circumferentially and outwardly of the axis of the staff 4.

A washer 22 on the staff 4 is in engagement with the upper side of the hub. A similar washer 24 on the staff is separated from the washer 22 by a compression spring 26.

A pair of lock nuts 28 are in threaded engagement with the upper threaded end of the staff 4 and may be adjusted for varying the action of the spring 26 which urges the hub downwardly relative to the friction member 14.

An arm has an outer longitudinal portion 30 which terminates in an eye T representing and adapted to function as a tee for a ball, as shown. The inner end 33 of said arm extends through an opening 32 of the hub and is looped around at 34 with a run portion 36 extending through an opening 38 of said hub. The outer end of the run portion 36 is turned outwardly as at 40.

A pointer 42 has an inner portion 43 which extends through the opening 38 of the hub and is looped around at 44 with a run 46 extending through the opening 32 of the hub. The end of the run 46 is turned outwardly as at 48.

A ramp 50 is secured to the base 2 by screws 52 or the like and has a vertical face 54, as shown.

The arm 30 may be formed from wire which is resilient, of light weight, strong and not likely to become set as a result of flexing. One form of wire adapted for the invention is commonly known as music wire and the member 42 may be formed from similar wire.

The arm may be formed from other material than wire or music wire, but it is necessary and desirable that the arm be of light weight, strong and readily flexible. Flexibility is important for the reason the arm should not become deformed by reason of repeated impacts of a golf club head but should maintain its flexibility and return to its normal shape after each impact.

The arm instead of having an end in the form of an eye representing a tee may have an end of any desired form or may carry the representation of a golf ball.

In practise with the apparatus, the arm 30 is set against the vertical face 54 of the ramp. The golfer be he right handed will take his stand in front of the front edge 2 of the base which may rest on the ground or floor without securing thereto.

The golfer in making a stroke with a golf club will assume the proper stance and swing the club so that the head thereof will impact the tee T. If desired a practise golf ball may be disposed on the tee.

The impact of the club head with the tee T causes the arm 30 to flex, and swing. The hub however being frictionally restrained or retarded against rotation its angle of rotation is relatively less than the angle of flex or swing of the arm 30.

In practise as in the play of golf the speed or force of the impact of the golf club head with the tee T may vary with the nature of the stroke so that the angle of flex of the arm may vary. The angle of rotation of the hub relative to the angle of swing of the arm is dependent on the frictional action of the hub 20 and washer 14.

In the play of golf with certain swing of the club and with the ball being properly impacted by the club head there will result a drive of a certain length. The apparatus is arranged to visually indicate the length of drive resulting from a certain stroke or swing of the club.

Indicia representing various lengths of drive are provided on the upper facing of the base, as shown. These are for registration by the member 42 when the hub is rotated, or by the arm 30 as may be desired.

The frictional action resisting rotation of the hub may be adjusted for calibration of the apparatus. With a certain stroke of a golf club to bring about a certain impact of the head with the tee the adjustment may be such that the hub is rotated so that the member 42 will coincide with indicia to indicate the length of drive on the golf course which would result from the certain stroke.

In other words the apparatus may be adjusted or calibrated so that for practise purposes a player may visualize the length of drive resulting from his swing or stroke of the golf club all to the end that his game of golf, in so far as driving is concerned, will be improved.

The apparatus as shown is adapted for a right hand player but may be modified for a left hand player. Or the apparatus as shown may be turned around for a left hand player so that he stands adjacent and in front of the straight edge or what is shown as the rear edge of the base.

In such a case the T eye of the arm 30 will be disposed beyond that edge of the base which is opposite to the edge of the base nearest the player.

The apparatus has been shown and described in the form at present preferred but changes and modifications may be made therein without departing from the scope and spirit of the invention.

What it is desired to claim and secure by Letters Patent of the United States is:

1. In golf practise apparatus, a base having a staff extending upwardly therefrom provided with an upper threaded end, friction means around said staff on the upper face of said base, a hub rotatable on said staff having a lower face in frictional engagement with said friction means, adjustable means on the upper end of said staff operable on said hub to vary the frictional action between said hub and friction means, said hub provided with a pair of spaced openings disposed on opposite sides of the longitudinal axis of said staff, an arm having an outer tee end and an inner end extending through one of said openings and being looped around at one side of the hub providing a run extending through the other of said openings, an indicator having an inner end extending through said other opening and being looped around at an opposite side of said hub providing a run extending through said one opening, said arm and indicator extending radially from opposite sides of said hub, and indicia for indicating lengths of drive on said base below said arm.

2. Golf practise apparatus set forth in claim 1 wherein said arm includes an elongated flexible portion outwardly of said hub.

3. Golf practise apparatus comprising in combination, a base member having an upper face disposed in a horizontal plane and provided with a staff extending vertically upwardly from said face, a friction member on said face around said staff, a hub rotatable on said staff in frictional engagement with said friction member, said hub provided with a pair of horizontally disposed parallel openings therethrough at opposite sides of said staff, an elongated resilient arm member extending forwardly radially from said hub having an inner portion secured thereto by extending rearwardly through one of said openings of the hub and being looped around the hub at the rear side thereof and extending forwardly through the other opening of the hub, an elongated indicating pointer extending radially rearwardly of said hub having an inner end portion secured to the hub by extending forwardly through said other opening of the hub and being looped around at the forward side of the hub and extending rearwardly through said one opening, the extremities of the inner portions of said arm and pointer being offset laterally, the outer end of said arm being formed to support a golf ball, said upper face of the base provided with indicia with which said indicating pointer is registrable on rotation of said hub, and adjustable means at the upper end of said staff operable on the upper end of said hub to vary the frictional action between said hub and friction member.

4. Apparatus for the practise of the game of golf comprising in combination, a base support having an upper face, a staff extending upwardly from said support, a hub rotatable on said staff, friction means between said support and hub, adjusting means for varying the action of said friction means, an arm extending radially from said hub in one direction and having an outer tee end, an indicator extending radially from said hub in a direction opposite to said arm, indicia on the upper face of said support, said arm being swingable relative to the axis of said staff on impact of a club with the outer tee end thereof to rotate said hub, said friction means being arranged to limit rotation of said hub to an angle relatively less than the angle of swinging of said arm, said adjusting means being arranged for adjustment of said friction means to vary the relative angle of swing of said arm and rotation of said hub, connections between said indicator and arm including a pair of separate openings provided through said hub with the inner ends of said indicator and an arm extending through the openings and being looped around and returning through the other opening of the pair thereof.

References Cited in the file of this patent

UNITED STATES PATENTS

| | | |
|---|---|---|
| 1,528,393 | Benham | Mar. 3, 1925 |
| 1,690,158 | Currie | Nov. 6, 1928 |
| 1,800,934 | Fox et al. | Apr. 14, 1931 |
| 2,641,933 | Van Kenkle | June 16, 1953 |